2,812,261
Patented Nov. 5, 1957

2,812,261

COMPOSITION AND METHOD FOR INHIBITING COLOR CHANGES OF CURED MEAT PRODUCTS

Morris Wasserman, Chicago, Ill., assignor to Meat Industry Suppliers, Inc., Chicago, Ill., a corporation of Illinois No Drawing. Application April 12, 1956,
Serial No. 577,645

5 Claims. (Cl. 99—222)

This invention relates to cured meat products of improved appearance. These products retain their natural appetizing color for a longer time than any cured meat hithertofore known. It also relates to processes for curing meat which result in products of improved longer lasting color.

The red color of cured meat is very important from the standpoint of appeal to the consumer. Although discoloration to brown is not an indication that the meat is spoiled, brown colored meat appears less appetizing to the average consumer. For this reason, there have been efforts to inhibit this undesirable discoloration and to improve the color of cured meat products.

It is reported in U. S. 2,513,094, issued to Hall, that color, taste, and water-binding properties of cured meat products are improved by the addition to the curing pickle of molecularly dehydrated phosphates, having a molar ratio of sodium oxide to phosphorus pentoxide not greater than 1.7:1. However, other investigators found that the addition of these phosphates to comminuted meat products, such as bologna, produced no observable or measurable benefit with respect to color fixation or rate of fading.

It is an object of the instant invention to provide cured meat products of improved appearance.

It is a further object of the instant invention to provide improved compositions for use in the curing of meat.

It is a further object of the instant invention to provide a novel additive for curing compositions, use of which in curing meat results in less shrinkage and better color for longer periods of time than heretofore possible.

It is a further object of the instant invention to provide improved processes for curing meat.

These and other objects will become more apparent from the description and claims to follow.

The foregoing and other objects are achieved by the use of a curing composition comprising a conventional curing preparation, a non-toxic, edible salt of ascorbic acid and a non-toxic, edible phosphate salt, selected from the group consisting of tripolyphosphates, alkalinized metaphosphates, and mixtures thereof.

In practicing one embodiment of the invention, fresh meat is cured by a conventional process with a curing composition comprising sodium tripolyphosphate, sodium ascorbate, and a curing preparation, for example a conventional preparation containing a soluble nitrite-forming salt, sodium chloride, and spices. The phosphate salts are used with the curing preparation generally in amounts between about 0.05% and about 1.0% preferably about 0.5% by weight of the meat, and the ascorbate in amounts between about 0.005% and about 0.05%, preferably between about .03% and about .05% by weight of the meat. Generally, the ratio of ascorbate to phosphate is between about 1:9 and about 1:99.

Within the above range, the greater the percentage of phosphate employed the better is the appearance of the resulting cured meat. Use of 1% of phosphate in the meat results in a most appetizing appearing product.

The United States Government at present allows a maximum of 0.5% phosphate in some, but not all meat products. However, a superior product is obtained when 0.5% phosphate is used with a percentage of ascorbate high in the above range.

The sodium ascorbate and the sodium tripolyphosphate may be added to the curing preparation separately, or a mixture of the two, alone or with one or a combination of seasoning agents, condiments, or the like may be added to said preparation. For example, a curing additive contains ascorbate and phosphate in a ratio between about 1:9 and about 1:99 and salt and/or dextrose that is, the additive will consist essentially of between about 1% and about 10% by weight of the ascorbate and between about 90% and about 99% by weight of the phosphate. In a preferred embodiment, the additive comprises 93% to 95% of sodium tripolyphosphate, between about 2 and 4% sodium ascorbate, and salt.

Although sodium ascorbate is generally employed, in some cases ascorbic acid can be used in the practice of the instant invention. If the final curing composition is an alkaline solution, any ascorbic acid initially added will be converted to the sodium salt of the ascorbic acid. The sodium ascorbate is preferably added to the curing preparation immediately prior to the addition of the curing composition to the fresh meat.

The improved color produced by curing fresh meat as described herein in the presence of sodium ascorbate and a phosphate salt is not always evident immediately after the curing of the meat, but in some cases is observed only after the cured meat has been stored for several days. However, after several days, the cured meat becomes an intensified red color, and the rate of fading of this improved color is much slower than it is in conventionally produced cured meats. It retains its intense red color for several days after the storage period. In fact, the appetizing color persists until well after the time in which the meat would normally be sold to the ultimate consumer. The instant novel products also have a plumper, firmer appearance and taste the same as conventional type cured meat products.

The instant meat products are superior to those products cured with a preparation containing either sodium ascorbate or sodium tripolyphosphate singly rather than in combination with each other. The presence in the curing composition of the combination of ascorbate salt and phosphate salt as described herein results in a definite and unexpected synergistic improvement in color and firm appearance of the resulting cured meat product.

In another embodiment of the instant invention, sodium ascorbate and an alkalinized metaphosphate, such as commercial products which contain sodium oxide to phosphorus pentoxide in ratios of about 1.3 to 1, neutralized for example with sufficient trisodium phosphate to produce a pH between about 8.5 and about 9.5 in the aqueous phosphate solution is added to a curing preparation. The resulting meat product cured with this solution exhibits a firmness and an intense red color superior to meats cured according to conventional practice or cured in the presence of either sodium ascorbate or alkali metal phosphate but not in the presence of the combination of both from which the instant synergistic effect is produced.

In another specific embodiment of the invention, meat is cured with a composition, comprising a curing preparation, between about 0.05% and about 0.5% by weight of sodium ascorbate and between about 0.5% and about 10.0% by weight of a mixture containing about 85% sodium metaphosphate and about 15% by weight of trisodium phosphate. After curing, the meat is cooked and stored for several days. The resulting cured cooked meat product is of improved color and firmness.

By the term "curing preparation" as used herein, is meant either solid compositions of curing agents or liquid solutions or pickles. Conventional curing preparations usually contain sodium chloride, a soluble nitrite-forming salt and/or a nitrate salt, sugar, and spices. However, a number of variations in the curing agents are known and may be used in the practice of the instant invention.

In order to more clearly illustrate the character of the instant invention, but with no intention to be limited thereto, the following examples of the practice of the invention are given.

(I) Wieners were prepared by mixing about 70% by weight of beef and about 30% by weight of pork butts by grinding the beef and the pork separately before mixing. Salt, spice, a curing preparation containing a soluble nitrite-forming salt, salt, spices and water were added. The resulting mixture was divided into four separate batches, A, B, C, and D, each weighing about four pounds. Nothing additional was added to batch A. Batch B contained about 0.5% by weight of sodium tripolyphosphate. Batch C contained about 0.5% by weight of sodium tripolyphosphate and about 0.03% by weight of sodium ascorbate. Batch D contained about 0.03% by weight of sodium ascorbate.

Each batch was chopped and stuffed into a 32 mm. artificial casing, stored at a temperature of between 35° F. and 40° F. over night, and then smoked and cooked. The wieners of batches B and C were the plumper after cooking.

Four wieners of each batch were then cut and refrigerated for about four days. Definite color changes were then evident. The four wieners of batch D had begun to turn brown, while the color of the wieners of batches A and B were very brown. On the other hand, the wieners of batch C, which contained the combination sodium ascorbate and sodium tripolyphosphate exhibited an intensification of red color. In addition, the wieners of batch C had held their shape, while the other wieners had shrunk. After eleven days storage in the refrigerator, the differences in and the superiority of the color and the appearance of the wieners of batch C as compared to the other batches were even greater.

Wieners cured and cooked as described above were sliced open and exposed at atmospheric temperature. Within about twenty four hours, the wieners corresponding to batches A, B, and D were brown, while those of batch C which contained the combination sodium ascorbate and sodium tripolyphosphate were still red. After about forty-eight and about seventy two hours, those of batch C were still of superior color and appearance.

(II) A slice of beef round was trimmed of fat, and pieces averaging between about 190 and about 195 grams apiece were placed in curing solutions, designated E, F, G, and H, each containing about 3% by weight of sodium tripolyphosphate and about 0.05%, 0.1%, 0.2%, and 0.02% by weight respectively of sodium ascorbate. Pieces of the beef were also cured in solutions of the same curing preparation containing the same respective amounts of sodium ascorbate, but no phosphate. Each curing solution contained about 450 ml. of water, about 72 grams of sodium chloride, and about 14 grams of a commercial curing preparation containing a sodium nitrite salt. These solutions corresponded to about 62 to 64 salometer pickle.

The beef was immersed in curing solution for about five days at a temperature between about 40° and about 42° F. The cured beef was then drained, rinsed, cooked, and stored in plastic bags in a refrigerator. After about four days, the pieces of beef, which had been cured in the presence of the combination of sodium tripolyphosphate and sodium ascorbate, with the exception of batch H were much superior in color and appearance to those cured in solutions containing sodium ascorbate but no phosphate. Batch H did not contain a sufficient amount of the ascorbate salt to produce the synergistic color stabilization and improvement of appearance observed in batches E, F, and G, containing the combination of the sodium ascorbate and the sodium tripolyphosphate, both in sufficient amount.

(III) Beef was cured as described in Example II in four solutions, I, J, K, and L, containing conventional curing preparation to which about 0.1% by weight of sodium ascorbate and about 0.5%, 1.0%, 2.0%, and 5.0% by weight respectively of sodium tripolyphosphate was added. The resulting cured meats were of intense red.

When three batches of beef were cured in the same manner as described above with the exception that the curing composition contained about 3.0% by weight of sodium metaphosphate, trisodium phosphate, and tetrasodium pyrophosphate respectively, but no sodium ascorbate, no substantial nor synergistic improvement of color of the resulting cured meat was observed. The use of a curing composition containing a sufficient amount of the combination of sodium ascorbate and sodium metaphosphte, alkalinized with trisodium phosphate or other alkaline material, or preferably sodium tripolyphosphate is necessary to produce cured meats in which a synergistic improvement of color and appearance is evident.

(IV) Ten pounds of fresh beef was cured in the manner described in Example II except that the curing preparation was mixed with 0.05 lb. curing additive. The curing additive contained 94.2% sodium tripolyphosphate, 2.8% sodium ascorbate, and 3.0% salt. The cured beef was then cooked and stored for several days. Upon inspection, the beef was of superior red color and appearance as compared to beef cured by the same procedure but without the curing additive.

Although the instant invention has been described specifically for wieners and beef, it is applicable in the same manner to all types of cured meats, such wieners, beef sausage, bologna, ham, tongue, bacon, and the like.

Having thus fully described and illustrated the character of the instant invention, what is desired to be protected by Letters Patent is:

1. A synergistic additive for incorporating into curing preparations to preserve the color of the resulting cured meat which comprises sodium ascorbate and phosphate from the group consisting of sodium tripolyphosphate, sodium metaphosphate adjusted to a pH between about 8.5 and about 9.5 with trisodium phosphate, and mixtures thereof, said ascorbate and phosphate being present in a ratio by weight of between about 1:9 and about 1:99 respectively.

2. A meat curing composition which contains an additive combination to preserve color in the meat which comprises a curing preparation containing between about .05% and about .5% by weight sodium ascorbate, and between about .5% and about 10% by weight phosphate from the group consisting of sodium tripolyphosphate, a mixture containing about 85% by weight sodium metaphosphate and about 15% by weight trisodium phosphate, and mixtures thereof said ascorbate and phosphate present in the ratio between about 1:9 and 1:99 respectively.

3. A composition used for curing meat, which composition contains a synergistic combination to preserve the color and appetizing appearance of the meat and, which on a dry basis consists essentially of curing preparation and seasoning agents, between about 0.005% and about 0.05% by weight of the meat of sodium ascorbate, between about 0.05% and about 1.0% by weight of the meat of phosphate from the group consisting of sodium tripolyphosphate, sodium metaphosphate adjusted to a pH of between about 8.5 and about 9.5 with trisodium phosphate, and mixtures thereof, said ascorbate and phosphate being used in a ratio by weight of between about 1:9 and about 1:99.

4. In processes for the production of cooked cured meat products involving treating fresh meat with a curing preparation and cooking the resulting cured meat, the improvements comprising curing fresh meat with a composition comprising a curing preparation and a synergistic combination for preserving the color of meat consisting essentially of, sodium ascorbate, and phosphate from the group consisting of sodium tripolyphosphate, a phosphate mixture containing about 85% by weight sodium metaphosphate and about 15% by weight trisodium phosphate, and mixtures thereof, between about .05% and about 0.5% by weight of the meat of the phosphate salt and between about 0.005% and about 0.05% by weight of the meat of sodium ascorbate having been mixed with the curing composition immediately prior to mixing said curing preparation with the fresh meat.

5. A method for inhibiting color changes of cured meat products which comprises adding to preparations used for curing of meat between about 0.005% and about 0.05% by weight of the meat of non-toxic alkali metal ascorbate and between about 0.05% and about 1.0% by weight of the meat of phosphate from the group consisting of sodium tripolyphosphate, sodium metaphosphate adjusted to a pH between about 8.5 and about 9.5 with trisodium phosphate, and mixtures thereof, said ascorbate and phosphate being in a ratio by weight of between about 1:9 and 1:99.

References Cited in the file of this patent

UNITED STATES PATENTS

| | | |
|---|---|---|
| 2,513,094 | Hall | June 27, 1950 |
| 2,707,154 | Lehmann et al. | Apr. 26, 1955 |
| 2,735,776 | Bickel | Feb. 21, 1956 |
| 2,739,899 | Hollenbeck | Mar. 27, 1956 |

FOREIGN PATENTS

| | | |
|---|---|---|
| 696,617 | Great Britain | Sept. 2, 1953 |

OTHER REFERENCES

"The National Provisioner," July 31, 1954, page 26.